(12) United States Patent
Haupt

(10) Patent No.: US 6,729,990 B1
(45) Date of Patent: May 4, 2004

(54) AUTOMATIC GEARBOX

(75) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/009,162

(22) PCT Filed: Jul. 7, 2000

(86) PCT No.: PCT/EP00/06480

§ 371 (c)(1),
(2), (4) Date: Nov. 8, 2001

(87) PCT Pub. No.: WO01/04513

PCT Pub. Date: Jan. 18, 2001

(30) Foreign Application Priority Data

Jul. 13, 1999 (DE) .......................... 199 32 613

(51) Int. Cl.$^7$ .............................. F16H 37/00
(52) U.S. Cl. .......................... 475/136; 475/59; 74/733.1
(58) Field of Search ............................ 74/730.1, 731.1, 74/732.1, 733.1; 475/59, 60, 61, 47, 48, 57, 58, 116, 136

(56) References Cited

U.S. PATENT DOCUMENTS

| | | | |
|---|---|---|---|
| 4,242,924 A | 1/1981 | Melhorn et al. ............... 74/759 |
| 4,267,910 A | 5/1981 | Yamamori et al. ......... 192/17 R |
| 4,347,765 A | 9/1982 | Leonard et al. ............... 74/869 |
| 4,404,869 A | 9/1983 | Numazawa et al. ........... 74/740 |
| 4,416,168 A | 11/1983 | Arai et al. ..................... 74/740 |
| 4,428,253 A | * 1/1984 | Kodama et al. ......... 475/136 X |
| 4,483,215 A | * 11/1984 | Ishimaru et al. ............... 475/59 |
| 4,674,358 A | 6/1987 | Nishimura .................... 74/745 |
| 5,026,337 A | * 6/1991 | Miura et al. ............... 475/59 X |
| 5,106,352 A | 4/1992 | Lepelletier ................... 475/280 |
| 5,122,103 A | 6/1992 | Nakawaki et al. ........... 475/278 |
| 5,234,087 A | 8/1993 | Jürgens et al. ................. 74/330 |
| 5,495,778 A | 3/1996 | Mochizuki ................. 74/606 R |
| 5,573,092 A | 11/1996 | Gabilondo ................. 192/18 A |
| 5,725,455 A | * 3/1998 | Kamada et al. ......... 74/733.1 X |
| 5,792,019 A | * 8/1998 | Park ............................ 475/206 |
| 5,816,972 A | 10/1998 | Park ............................ 475/284 |
| 5,823,910 A | 10/1998 | Park ............................ 475/271 |
| 5,836,849 A | 11/1998 | Mathiak et al. .............. 475/269 |
| 5,887,690 A | 3/1999 | Haupt ...................... 192/87.11 |
| 5,950,787 A | 9/1999 | Murasugi et al. ......... 192/85 AA |
| 5,971,821 A | 10/1999 | Hultsch et al. ................. 440/74 |
| 6,086,506 A | 7/2000 | Petersmann et al. .......... 477/45 |
| 6,101,440 A | 8/2000 | Wagner et al. ................. 701/67 |
| 6,139,463 A | 10/2000 | Kasuya et al. .............. 475/275 |
| 6,244,402 B1 | 6/2001 | Domian et al. ............ 192/3.51 |
| 6,358,173 B1 | * 3/2002 | Klemen et al. ................. 475/5 |

FOREIGN PATENT DOCUMENTS

| | | | |
|---|---|---|---|
| DE | 29 37 565 | 3/1980 | ........... F16H/57/08 |
| DE | 29 37 366 | 4/1980 | ............. F16H/3/46 |
| DE | 40 41 159 A1 | 7/1992 | ......... F16D/25/0638 |
| DE | 41 20 540 C1 | 11/1992 | ........... F16H/59/06 |
| DE | 4419033 | * 12/1994 | ................. 477/156 |
| DE | 4431892 | * 3/1995 | |
| DE | 44 07 943 A1 | 8/1995 | ........... F16D/67/04 |
| DE | 195 04 847 A1 | 9/1995 | ........... F16H/61/14 |
| DE | 44 15 664 A1 | 11/1995 | ........... F16D/13/52 |
| DE | 195 00 432 A1 | 12/1995 | ........... F16D/65/20 |

(List continued on next page.)

*Primary Examiner*—Ha Ho
(74) *Attorney, Agent, or Firm*—Davis & Bujold, PLLC

(57) ABSTRACT

The automatic transmission for motor vehicles, especially with transverse drive with six gear steps, has a main wheel train (2), a front-mounted wheel train (1) and five wet running clutches and brakes (A to E) and is connected to the output shaft of an internal combustion engine via a torsional-vibration damper; the front-mounted wheel train (1) located in force flow direction before the main wheel train (2) is spatially situated behind the main wheel train (2).

17 Claims, 2 Drawing Sheets

FOREIGN PATENT DOCUMENTS

| | | | | |
|---|---|---|---|---|
| DE | 195 44 517 A1 | 6/1997 | ........... | F16H/61/06 |
| DE | 195 46 707 A1 | 6/1997 | ........... | B60K/17/00 |
| DE | 196 25 355 A1 | 1/1998 | ........... | B60K/17/06 |
| DE | 197 42 644 A1 | 4/1998 | ........... | F16D/25/06 |
| DE | 197 27 801 A1 | 1/1999 | ........... | F16D/13/22 |
| DE | 199 12 481 A1 | 9/2000 | ............ | F16H/3/62 |
| EP | 0 214 989 B2 | 3/1987 | ............ | F16H/3/66 |
| EP | 0 342 672 A1 | 11/1989 | | |
| EP | 0 419 782 A1 | 4/1991 | ........... | F16H/47/08 |
| EP | 0 483 764 A1 | 5/1992 | ........... | F16H/37/02 |
| EP | 0 825 359 A2 | 2/1998 | ............ | F16H/3/66 |
| EP | 0 962 680 A2 | 12/1999 | ............ | F16H/3/66 |
| GB | 2 249 361 A | 5/1992 | ............ | F16H/3/62 |

\* cited by examiner

| GEAR | CLUTCH | | | BRAKE | | RATIO | RATIO STEP |
|---|---|---|---|---|---|---|---|
| | A | B | E | D | C | | |
| 1 | O | | | O | | 4,28 | |
| | | | | | | | 1,79 |
| 2 | O | | | | O | 2,39 | |
| | | | | | | | 1,58 |
| 3 | O | O | | | | 1,51 | |
| | | | | | | | 1,33 |
| 4 | O | | O | | | 1,14 | |
| | | | | | | | 1,31 |
| 5 | | O | O | | | 0,86 | |
| | | | | | | | 1,27 |
| 6 | | | O | | O | 0,68 | |
| R | | O | | O | | -3,24 | TOTAL 6,28 |

Fig. 2

AUTOMATIC GEARBOX

FIELD OF THE INVENTION

The invention relates to an automatic transmission.

BACKGROUND OF THE INVENTION

Multi-gear automatic transmissions have been known for a long time. They usually consists of planetary trains which are shifted by means of clutches and brakes and are connected via a hydrodynamic torque converter with the power train of the vehicle, especially of an internal combustion engine.

Earlier multi-gear automatic transmissions were designed as three-gear transmissions having one double planetary train and four or five clutches. There have also been produced more complex four-gear transmissions which have been constructed on the basis of the classical three-gear transmissions adding to them one simple planetary train with two reduction ratios and two clutches and brakes so that the systems have altogether one double planetary train, one simple planetary train, six or seven clutches and brakes, the same as the torque converter and a lock-up clutch.

In the meantime, five-gear and six-gear transmissions have also been developed which, in addition, have one planetary train with two reduction ratios and two clutches and brakes. This leads to multi-gear automatic transmissions with altogether one double planetary train, one simple planetary train, seven or eight clutches and brakes in addition. To the torque converter with the lock-up clutch which also require considerable space.

In the Applicant's DE 44 15 664, a multi-gear automatic transmission with wet-running clutches and brakes in disk design has been described. Each clutch or brake consists of a first cylinder with outer disks, a second cylinder with inner disks, a piston and a recoil element, both cylinders being provided in the area of the disks with axially extending grooves so that the disks can be axially moved by the piston. The cylinder/disk torque transmission is form locking with the clutch closing while the piston presses the disks against an end stop. The force for adjusting the piston is applied by the oil contained in the transmission. The clutch opens while the action of force of the oil is broken down. By the recoil element the piston is pushed back to its original position whereby the frictional engagement of the inner and outer disks is released.

The problem on which this invention is based is to provide an automatic transmission having at least six gear steps and large spreading effect, which has a compact construction and is easily situated in vehicles having front wheel drive and transversely lying engine.

SUMMARY OF THE INVENTION

It is proposed, therefore, according to the invention, that by adequate selection and coupling of the gears of the wheel train one of the clutches of the main transmission is both the starting clutch for the motor vehicle and the gear clutch for the first gear and for the reverse gear.

The use of one clutch of the main transmission as a wet starting clutch makes the elimination of the formerly customary separate starting element possible, such as a hydrodynamic torque converter. The starting clutch assumes several functions in the transmission, in addition to its primary function as gear clutch in the change of gear, it assumes the function of starting.

The adequate selection of the wheel train so that only one and the same starting clutch can be produced, the positive engagement both for the first gear and for the reverse gear offers the advantage that only this starting clutch has to be thermally and automatically controlled in such a manner that the starting is made possible both in forward direction and in reverse direction.

The thermal and automatic control design of the inventive starting clutch is to be selected so that it bears the thermal load when starting without problem and also makes a sensitive starting possible. This ensures a great driving comfort when starting at less expense than in the conventional multi-gear automatic transmission where a hydrodynamic torque converter, for example, takes over the starting function. Rolling out shifts to the first gear require a sensitive application of the clutch torque.

As a specially advantageous inventive design of the starting clutch, it is proposed to design the clutch with two pistons so that during pressurization the second piston presses only one part of the friction disk of the starting clutch thus increasing the pressure to torque ratio. To this end, both pistons can be pressurized simultaneously or independently of each other.

An advantageous design and arrangement of the starting clutch as brake, such as described in DE-A-196 25 355, makes an easy supply of the cooling oil possible, since the oil supply does not proceed through rotating parts with the attendant expensive sealing due to rectangular rings, for example.

Since a large amount of cooling oil is needed only during the starting operation, the cooling oil supplied is advantageously controlled specifically by control of the oil amount equal in time to the real onset of heat. The latter is determined by electronic evaluation of torque and differential rotational speed of the starting clutch so that the oil supply can be designed according to requirement which results in minimizing the transmission losses. In particular, the cooling of the latter outside the slip phase of the starting clutch can be minimal, even zero. The spared cooling oil can be used for the remaining clutches and for cooling the wheel trains.

BRIEF DESCRIPTION OF THE DRAWINGS

The invention is will now be described, by way of example, with reference to the accompanying drawings in which:

FIG. 2 is a table of the clutch logic of the automatic transmission shown in FIG. 1.

DETAILED DESCRIPTION OF THE INVENTION

Figure 1:
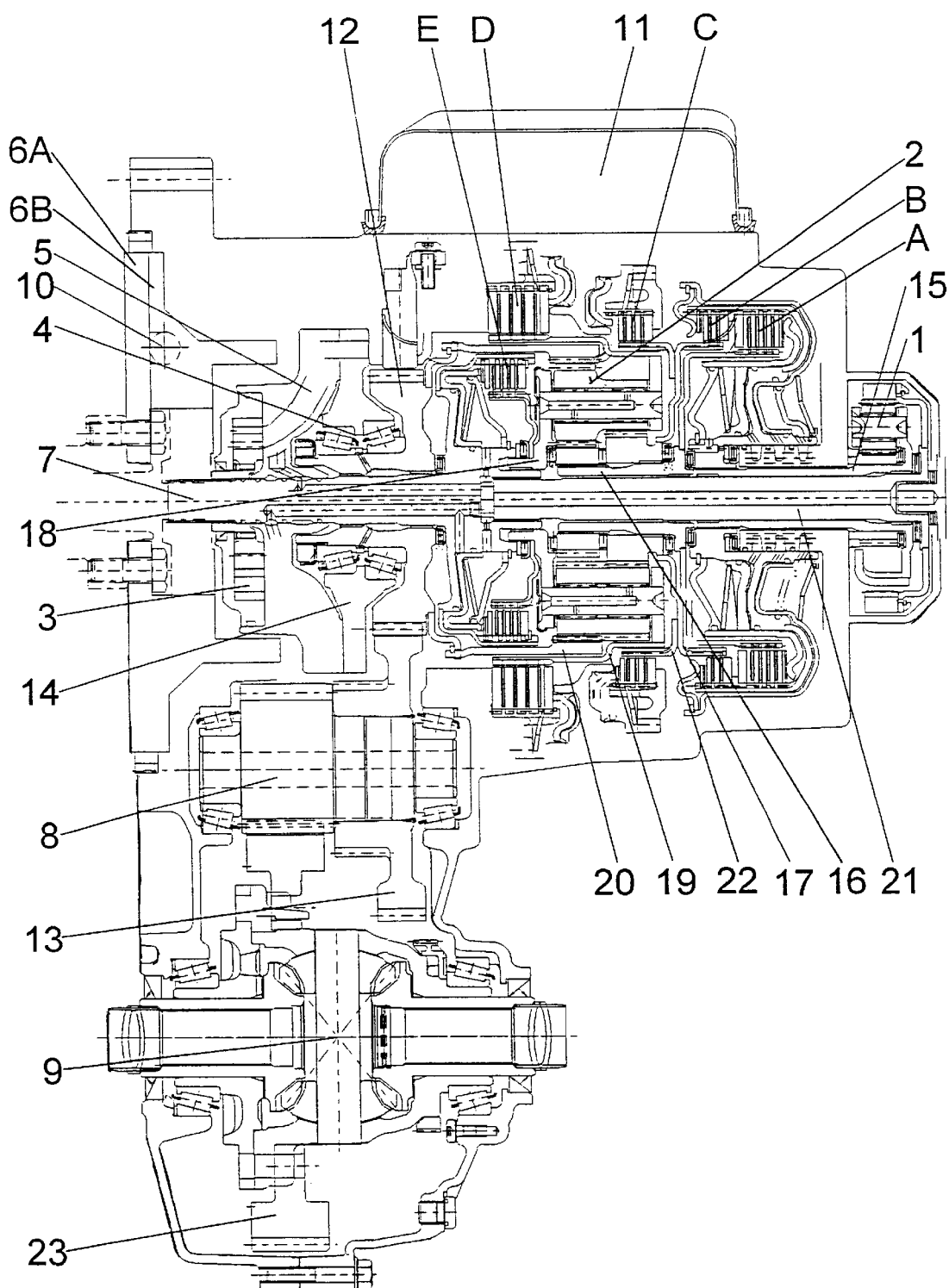
FIG. 1 is a sectional drawing of an inventively designed 6-gear automatic transmission.

FIG. 1 shows a cross-section through an inventive automatic transmission with six gear steps wherein with 7 is designated an input shaft which communicates via a torsional-vibration damper with the crankshaft of an internal combustion engine (not shown). On the side of the main transmission spatially remote from the internal combustion engine, a front-mounted gear train 1 is provided which is situated in force flow direction before the main wheel train 2 and constitutes an additional ratio and together with the arbitrarily configured main wheel train 2 situated in the main transmission achieves a higher total spreading and a good gear graduation compared to the customary four-gear automatic transmissions. Depending on the design of the constant transmission ratio, clear advantages result relative to driving performance or to fuel consumption.

The front-mounted gear train 1 is designed as simple planetary gear train wherein the input shaft 7 is connected with the drive shaft 21 of the front-mounted wheel train 1 and, in the example shown, drives the hollow wheel thereof. The sun of the front-mounted wheel train is fixed to the housing. With 15 is designated an output shaft of the front-mounted wheel train 1 through which the power flow is passed on to the main wheel train 2. In principle, other drafts of planetary wheel train for the development of the front-mounted wheel train 1 can be shown having then a different shaft installation.

In the inventive designed example, the main wheel train 2 is constructed as a Ravigneaux train with three drive shafts 16, 17 and 18. The first drive shaft 16 is connected with a clutch A. The second drive shaft 17 is connected with a clutch B. The third drive shaft 18 is connected with a clutch E and with the input shaft 7. With 19 is designated a supporting shaft of the main wheel train 2 which is connected both with a brake D and with the third drive shaft 18. With 22 is finally designated a second supporting shaft of the main wheel train 2 which is connected both with a brake C and with the second drive shaft 17. Depending on the gear step, the power flow is guided from the input shaft 7, via the clutches and brakes, pressurized according to shifting logic and via the wheel train combination 1, 2 to the output shaft 20 of the main wheel train 2.

According to the preamble of the main claim, the invention relates to an automatic transmission.

Multi-gear automatic transmissions have been known for a long time. They usually consists of planetary trains which are shifted by means of clutches and brakes and are connected via a hydrodynamic torque converter with the power train of the vehicle, especially of an internal combustion engine.

Earlier multi-gear automatic transmissions were designed as three-gear transmissions having one double planetary train and four or five clutches. There have also been produced more complex four-gear transmissions which have been constructed on the basis of the classical three-gear transmissions adding to them one simple planetary train with two reduction ratios and two clutches and brakes so that the systems have altogether one double planetary train, one simple planetary train, six or seven clutches and brakes, the same as the torque converter and a lock-up clutch.

In the meantime, five-gear and six-gear transmissions have also been developed which, in addition, have one planetary train with two reduction ratios and two clutches and brakes. This leads to multi-gear automatic transmissions with altogether one double planetary train, one simple planetary train, seven or eight clutches and brakes in addition. To the torque converter with the lock-up clutch which also require considerable space.

In the Applicant's DE 44 15 664, a multi-gear automatic transmission with wet-running clutches and brakes in disk design has been described. Each clutch or brake consists of a first cylinder with outer disks, a second cylinder with inner disks, a piston and a recoil element, both cylinders being provided in the area of the disks with axially extending grooves so that the disks can be axially moved by the piston. The cylinder/disk torque transmission is form locking with the clutch closing while the piston presses the disks against an end stop. The force for adjusting the piston is applied by the oil contained in the transmission. The clutch opens while the action of force of the oil is broken down. By the recoil element the piston is pushed back to its original position whereby the frictional engagement of the inner and outer disks is released.

The problem on which this invention is based is to provide an automatic transmission having at least six gear steps and large spreading effect, which has a compact construction and is easily situated in vehicles having front wheel drive and transversely lying engine.

Departing from an automatic transmission of the kind specified above, said problem is solved with the characteristics stated in claim 1; advantageous developments are described in the sub-claims.

It is proposed, therefore, according to the invention, that by adequate selection and coupling of the gears of the wheel train one of the clutches of the main transmission is both the starting clutch for the motor vehicle and the gear clutch for the first gear and for the reverse gear.

The use of one clutch of the main transmission as a wet starting clutch makes the elimination of the formerly customary separate starting element possible, such as a hydrodynamic torque converter. The starting clutch assumes several functions in the transmission, in addition to its primary function as gear clutch in the change of gear, it assumes the function of starting.

The adequate selection of the wheel train so that only one and the same starting clutch can be produced, the positive engagement both for the first gear and for the reverse gear offers the advantage that only this starting clutch has to be thermally and automatically controlled in such a manner that the starting is made possible both in forward direction and in reverse direction.

The thermal and automatic control design of the inventive starting clutch is to be selected so that it bears the thermal load when starting without problem and also makes a sensitive starting possible. This ensures a great driving comfort when starting at less expense than in the conventional multi-gear automatic transmission where a hydrodynamic torque converter, for example, takes over the starting function. Rolling out shifts to the first gear require a sensitive application of the clutch torque.

As a specially advantageous inventive design of the starting clutch, it is proposed to design the clutch with two pistons so that during pressurization the second piston presses only one part of the friction disk of the starting clutch thus increasing the pressure to torque ratio. To this end, both pistons can be pressurized simultaneously or independently of each other.

An advantageous design and arrangement of the starting clutch as brake, such as described in DE-A-196 25 355, makes an easy supply of the cooling oil possible, since the oil supply does not proceed through rotating parts with the attendant expensive sealing due to rectangular rings, for example.

Since a large amount of cooling oil is needed only during the starting operation, the cooling oil supplied is advantageously controlled specifically by control of the oil amount equal in time to the real onset of heat. The latter is determined by electronic evaluation of torque and differential rotational speed of the starting clutch so that the oil supply can be designed according to requirement which results in minimizing the transmission losses. In particular, the cooling of the latter outside the slip phase of the starting clutch can be minimal, even zero. The spared cooling oil can be used for the remaining clutches and for cooling the wheel trains.

The invention is described in detail herebelow with reference to the drawing according to FIG. 1 and the clutch logic according to FIG. 2 in which an advantageous embodiment is shown.

FIG. 1 is a sectional drawing of an inventively designed 6-gear automatic transmission; and FIG. 2 is a table of the clutch logic of the automatic transmission shown in FIG. 1.

FIG. 1 shows a cross-section through an inventive automatic transmission with six gear steps wherein with 7 is designated an input shaft which communicates via a torsional-vibration damper with the crankshaft of an internal combustion engine (not shown). On the side of the main transmission spatially remote from the internal combustion engine, a front-mounted gear train 1 is provided which is situated in force flow direction before the main wheel train 2 and constitutes an additional ratio and together with the arbitrarily configured main wheel train 2 situated in the main transmission achieves a higher total spreading and a good gear graduation compared to the customary four-gear automatic transmissions. Depending on the design of the constant transmission ratio, clear advantages result relative to driving performance or to fuel consumption.

The front-mounted gear train 1 is designed as simple planetary gear train wherein the input shaft 7 is connected with the drive shaft 21 of the front-mounted wheel train 1 and, in the example shown, drives the hollow wheel thereof. The sun of the front-mounted wheel train is fixed to the housing. With 15 is designated an output shaft of the front-mounted wheel train 1 through which the power flow is passed on to the main wheel train 2. In principle, other drafts of planetary wheel train for the development of the front-mounted wheel train 1 can be shown having then a different shaft installation.

In the inventive designed example, the main wheel train 2 is constructed as a Ravigneaux train with three drive shafts 16, 17 and 18. The first drive shaft 16 is connected with a clutch A. The second drive shaft 17 is connected with a clutch B. The third drive shaft 18 is connected with a clutch E and with the input shaft 7. With 19 is designated a supporting shaft of the main wheel train 2 which is connected both with a brake D and with the third drive shaft 18. With 22 is finally designated a second supporting shaft of the main wheel train 2 which is connected both with a brake C and with the second drive shaft 17. Depending on the gear step, the power flow is guided from the input shaft 7, via the clutches and brakes (shift elements), pressurized according to shifting logic and via the wheel train combination 1, 2 to the output shaft 20 of the main wheel train 2.

In principle, the main wheel train 2 can be shown in any other design having a correspondingly different tying to the output of the front-mounted wheel train, to the transmission output and to the clutches and brakes.

The total ratio results from the parameters of the front-mounted wheel train 1, of the main wheel train 2 and of a constant reduction step. The constant reduction step consists of a spur gear 12 fixedly connected with an output shaft 20 of the main wheel train 2, a spur gear 13 connected with the short side shaft 8, a spur gear toothing of the short side shaft 8 and a spur gear 23 connected with a differential 9.

As a specially advantageous development of the constant transmission reduction step, it is proposed, according to the invention, to arrange the spur gears 12, 13, 8 and 23 in longitudinal direction of the transmission so that the side wheel 23 of a large diameter lies in longitudinal direction of the transmission upon the side of the differential 9 facing the prime mover, that is, the differential center lies in longitudinal direction of the transmission calculated on the prime mover behind the toothing of the spur gear 23. In this manner results a very compact construction of the transmission and a small length, especially in the differential area of the vehicle in which the sub-frame of the axle and aggregate suspension usually extends.

In FIG. 1 is further designated with 3 an oil pump, such as an internal gear-type pump, which is situated in the area between the prime mover and a spur gear bearing 4 of the spur gear 12 and which is directly driven by the drive shaft 7. A bearing plate 14 which accommodates the spur gear bearing 4 attaches itself directly to an intermediate plate 5 which accommodates the pump 3. Such constructional arrangement of pump 3 and support of the spur gear 12 makes an optimal utilization of space possible by including the gearing plate 14 of the spur gear bearing 4 in the oil duct in the pump area together with the usual oil guide labyrinth of the intermediate plate 5.

In another embodiment, it can be provided directly to accommodate the pump 3 in a housing part (not shown in detail) and integrate the oil guiding ducts close to the pump directly into the transmission housing in communication with the oil guiding ducts in the bearing plate 14.

With 6B is further designated a secondary inertia mass which is provided between the prime mover (not shown), preferably an internal combustion engine, and the drive shaft 7 in immediate proximity to a primary inertia mass 6A and connected therewith via a spring/damper element 10. The combination of parts 6A, 6B and 10 form a functional unit as two-mass flywheel for torsional vibration insulation during torque transmission from the internal combustion engine to the transmission. Other systems for torsional vibration damping, such as a hydraulic torsion damper, can be similarly integrated constructionally.

The inventive arrangement proposed of the components torsional vibration damper, oil pump and spur gear bearing makes an optimal design in constructional length possible. In combination with a starting brake D integrated in the transmission, which is disposed upon a larger diameter than the main wheel train 2 and which, in longitudinal direction of the transmission, attaches itself directly behind the short side shaft 8, there results a specially compact transmission construction with optimal utilization of installation space so that a crosswise installation is also taken into consideration for vehicles critical as to installation space. By adequate nesting of the spur gear axles, small axial spacings are possible and thus also small spur gears with the advantage as to noise associated therewith, low cost and light weight. The constant reduction step with the spur gears 12, 13, 8 and 23 is situated in the transmission on the driving side and near the engine and surrounded by transmission parts and by the engine so that noise emission can be minimized.

As FIG. 1 further allows to understand, the front-mounted wheel train 1 makes a smaller diameter of the transmission housing possible in the area of the vehicle stringer critical for the installation space when the engine/transmission unit is transversely installed.

FIG. 2 shows the clutch logic of the transmission shown in FIG. 1.

With A to E are designated the five clutches and brakes required for the inventively designed 6-gear transmission, the brake D being provided as wet starting element which performs several functions. The brake D, together with the function as shifting element during the gear change from first to second gear, represents the positive engagement in the gears one and R and assumes the task of starting. To this end, the toothed wheels of the wheel train system, which is composed of the front-mounted wheel train 1 and the main wheel train 2, are selected so that with one and the same shifting element, i.e. the starting brake D, the positive engagement both for the first gear and for the reverse gear can be produced. This means that only the starting brake is built thermally and technically controlled so that both the starting in forward direction and the starting in reverse direction is possible. The thermally and technically controlled construction of the starting brake D is to be selected so that it bears the high thermal load when starting according to the driver's wish and at the same time makes a sensitive starting possible. On one hand, this ensures a great driving comfort when starting and, on the other hand, makes a small construction cost possible compared to the conventional multi-gear automatic transmissions with separate starting element such as with a hydrodynamic converter.

For the constructional development of the starting element, the "brake" design is advantageous, since an easy supply of cooling oil is possible without guiding the oil through rotary parts and the expensive sealing associated therewith.

The amount of coolant required for cooling is now controlled, since large amounts of coolant are needed only during the starting operation. The amount of cooling oil adequate to need is controlled based on the real heat onset, this being correctly calculated in time by the electronic transmission control by electronic evaluation of the actual command rate of torque and differential rotational speed of the starting brake D. This means that the oil supply can be designed smaller so that to minimize the transmission losses are made possible. When introducing the forward gear, a clutch A that guides the torque to the first gear is closed and the starting brake D is used, the cooling of the latter being minimally possible even zero, since in this state no torque, or only a very small one, is transmitted. The same applies to the introduction of the reverse gear in which a clutch B is shifted and the starting brake D is used. Only during the friction phase that follows is the current of cooling oil enlarged.

Thermal over-dimensioning of the starting brake D is not required when, as proposed by the invention, upon reaching a limiting temperature, which is calculated by the electronic transmission control by means of the torque and slip rotational speed in the course of time, it is signalized to the engine electronic system via a line or databus that the engine load has to be controlled back specifically to a value which can be thermally maintained without problem by the starting brake D. This can take place in periodic steps in which case, when the limiting temperature is maintained, the engine load is taken back as time function by the engine control continuously or also gradually.

By a simple structural configuration of the transmission housing, a supply of cooling oil current to the starting brake D is possible. In this manner, the duct conveyance is facilitated and, in particular, the controllability of the shifting element is improved.

An advantageous development of the inventive automatic transmission makes a so-called hill-holder function possible, that is, a function which prevents a rolling back of the vehicle when standing on a slope, as described in the Applicant's DE-A-196 25 355 for example. To this end, the output torque is supported by simultaneous closing of the two brakes D and C on the transmission housing and the transmission output is therefore blocked. The simultaneous opening of the clutch A for forward drive and of the clutch B for reverse drive prevents a dying down of the internal combustion engine.

The short length, the light weight, the reduction of cost and a reduction of the transmission losses by eliminating the hydrodynamic converter result in that, despite the additional front-mounted wheel train 1 being provided, the inventive 6-gear automatic transmission offers special advantages for the transverse installation in small vehicles. Other advantages result from the gain in spreading by six gear steps, especially with regard to driving performance and fuel consumption.

Reference Numerals

1 front-mounted wheel train
2 main wheel train
3 pump
4 spur gear bearing
5 intermediate plate
6A primary inertia mass
6B secondary inertia mass
7 input shaft
8 short side shaft with spur gear toothing
9 differential
10 spring/damper element
11 installation space for hydraulic control unit
12 spur gear
13 spur gear
14 spur gear bearing plate
15 output shaft of the front-mounted wheel train
16 first drive shaft of the main wheel train
17 second drive shaft of the main wheel train
18 third drive shaft of the main wheel train
19 first supporting shaft of the main wheel train
20 output shaft of the main wheel train
21 drive shaft of the front-mounted wheel train
22 second supporting shaft of the main wheel train
23 spur gear
A, B, E clutches
C, D brakes

What is claimed is:

1. An automatic transmission for motor vehicles with at least six gear steps and having a main wheel train (2) and a front-mounted wheel train (1), several wet-running shift elements (A to E) and a pump (3) for generating the shifting pressure for the shift elements (A to E) in the individual gear steps and connected through an input shaft (7) to a torsional-vibration damper power input to the transmission;

wherein the main wheel train (2) and the front-mounted wheel train (1) are disposed in a power flow path through the transmission such that the front mounted wheel train (1) is connected in the power flow path by one of a first connection that is serial with and before the main wheel train (2) and a second connection that is parallel with the main wheel train (2), the front-mounted wheel train (1) and the main wheel train (2) are disposed co-axially with each other, the front-mounted wheel train (1) is non-shiftably designed and, relative to the input shaft (7), is situated spatially behind the main wheel train (2) upon a side of the automatic transmission remote from the input shaft (7) and an output of the main wheel train (2) is connected with a supported spur gear (12) operatively connected with a differential (9), and a bearing (4) is situated between the spur gear (12) and the pump (3).

2. The automatic transmission according to claim 1, wherein a second shifting element (C) for a second gear and a sixth gear is spatially situated, upon a larger diameter gear than the main wheel train (2), in a longitudinal direction of the transmission directly next to a starting shifting element (D) upon a side of the starting shifting element (D) remote from the input shaft (7).

3. The automatic transmission according to claim 1, wherein further shifting elements (A, B) which connect an output shaft (15) of the front-mounted wheel train (1) with drive shafts (16, 17) of the main wheel train (2) are spatially situated in a longitudinal direction of the transmission between the main wheel train (2) and the front-mounted wheel train (1).

4. The automatic transmission according to claim 1, wherein a first shifting element (E) which connects the input shaft (7) with a third drive shaft (18) of the main wheel train (2) is spatially situated in the longitudinal direction of the transmission between a constant reduction step (12,13, 8, 23) and the main wheel train (2).

5. The automatic transmission according to claim 1, wherein the pump (3) is spatially situated in a longitudinal direction of the transmission between the torsional-vibration damper power input and the bearing (4) of the spur gear (12) of a constant reduction step (12, 13, 8, 23), a bearing plate (14) of the bearing (4) attaches itself directly to an intermediate plate (5) which accommodates the pump (3), a bearing plate (14) is in communication with the intermediate plate (5), and oil conducting ducts are provided in a pump area.

6. The automatic transmission according to claim 1, wherein a constant reduction step (12, 13, 8, 23) is disposed so that the differential (9) lies in a longitudinal direction of the transmission upon a side of a second spur gear (23) remote from the input shaft (7).

7. An automatic transmission for motor vehicles with at least six gear steps and having a main wheel train (2) and a front-mounted wheel train (1), several wet-running shift elements (A to E) and a pump (3) for generating the shifting pressure for the shift elements (A to E) in the individual gear steps and connected via an input shaft (7) to a torsional-vibration damper power input to the transmission;

wherein the main wheel train (2) and the front-mounted wheel train (1) are disposed in a power flow path through the transmission such that the front mounted wheel train (1) is connected to the power flow path by one of a first connection that is serial with and before the main wheel train (2) and a second connection that is parallel with the main wheel train (2), the front-mounted wheel train (1) and the main wheel train (2) are disposed co-axially with each other, the front-mounted wheel train (1) is non-shiftably designed and, relative to the input shaft (7), is situated spatially behind the main wheel train (2) upon a side of the automatic transmission remote from the input shaft (7) and an output of the main wheel train (2) is connected with a supported spur gear (12) operatively connected with a differential (9), and a bearing (4) is situated between the spur gear (12) and the pump (3), and the wheel train system, comprising the front-mounted wheel train (1) and the main wheel train (2), provides positive engagement both for a first gear and for a reverse gear by a single, common starting shifting element (D).

8. The automatic transmission according to claim 7, wherein the positive engagement for the first gear and for the reverse gear is produced by the starting shifting element (D) integrated in the automatic transmission.

9. The automatic transmission according to claim 8, wherein the starting shifting element (D) is spatially situated, upon a larger diameter gear than the main wheel train (2), in a longitudinal direction of the transmission directly next to a constant reduction step (12, 13, 8, 23) upon a side of the constant reduction step remote from the input shaft (7).

10. The automatic transmission according to claim 7, wherein the starting shifting element (D) is cooled by a variable oil current and an amount of cooling oil is controlled as a function of onset of heat which is detected by electronic evaluation of torque and a differential rotational speed of the starting shifting element (D).

11. The automatic transmission according to claim 7, wherein the automatic transmission is electrically connected with an engine electronic system and communicates to the engine electronic system and, upon reaching a limiting temperature of the starting shifting element (D), generates a signal for controlling engine load back to a value corresponding to an upper thermal load capacity limit of the starting shifting element (D).

12. The automatic transmission according to claim 11, wherein the engine load is continuously controlled back to the value corresponding to the upper thermal load capacity limit of the starting shifting element (D).

13. The automatic transmission according to claim 11, wherein the engine load is controlled back to the value corresponding to the upper thermal load capacity limit of the starting shifting element (D) in steps.

14. The automatic transmission according to claim 7, wherein the starting shifting element (D) is energized via first and second pistons, and the second piston acting only upon one part of friction disks of the starting shifting element (D).

15. The automatic transmission according to claim 14, wherein both the first and second pistons of the starting shifting element (D) are simultaneously pressurized.

16. The automatic transmission according to claim 14, wherein both the first and second pistons of the starting shifting element (D) are pressurized independently of one another.

17. An automatic transmission for motor vehicles with at least six gear steps and having a main wheel train (2) and a front-mounted wheel train (1), several wet-running clutches and brakes (A to E) and a pump (3) for generating the shifting pressure for the clutches and brakes (A to E) in the individual gear steps and connected through an input shaft (7) to a torsional-vibration damper power input to the transmission;

wherein the main wheel train (2) and the front-mounted wheel train (1) are disposed in a power flow path through the transmission such that the front mounted wheel train (1) is connected in the power flow path by one of a first connection that is serial with and before the main wheel train (2) and a second connection that is parallel with the main wheel train (2), the front-mounted wheel train (1) and the main wheel train (2) are disposed co-axially with each other, the front-mounted wheel train (1) is non-shiftably designed and, relative to the input shaft (7), is situated spatially behind the main wheel train (2) upon a side of the automatic transmission remote from the input shaft (7) and an output of the main wheel train (2) is connected with a supported spur gear (12) operatively connected with a differential (9), a bearing (4) is situated between the spur gear (12) and the pump (3), and the front-mounted wheel train (2) is disposed in a separate part of a transmission housing.

* * * * *